US008947412B2

(12) United States Patent
Jeon et al.

(10) Patent No.: US 8,947,412 B2
(45) Date of Patent: Feb. 3, 2015

(54) DISPLAY DRIVING SYSTEM USING TRANSMISSION OF SINGLE-LEVEL EMBEDDED WITH CLOCK SIGNAL

(75) Inventors: Hyun-Kyu Jeon, Daejeon-si (KR); Yong-Hwan Moon, Incheon-si (KR)

(73) Assignee: Silicon Works Co., Ltd., Daejeon-Si (KR)

( * ) Notice: Subject to any disclaimer, the term of this patent is extended or adjusted under 35 U.S.C. 154(b) by 155 days.

(21) Appl. No.: 12/921,246

(22) PCT Filed: Oct. 7, 2009

(86) PCT No.: PCT/KR2009/005732
§ 371 (c)(1), (2), (4) Date: Sep. 7, 2010

(87) PCT Pub. No.: WO2010/047484
PCT Pub. Date: Apr. 29, 2010

(65) Prior Publication Data

US 2011/0181558 A1 Jul. 28, 2011

(30) Foreign Application Priority Data

Oct. 20, 2008 (KR) ........................ 10-2008-0102492

(51) Int. Cl.
*G06F 3/038* (2013.01)
*G09G 5/00* (2006.01)
*G09G 3/36* (2006.01)

(52) U.S. Cl.
CPC ............ *G09G 3/3611* (2013.01); *G09G 3/3688* (2013.01); *G09G 2370/08* (2013.01); *G09G 2370/14* (2013.01)
USPC ........... 345/209; 345/204; 345/205; 345/206; 345/207; 345/208

(58) Field of Classification Search
None
See application file for complete search history.

(56) References Cited

U.S. PATENT DOCUMENTS 6,903,716 B2 * 6/2005 Kawabe et al. ................. 345/99
7,015,903 B2 * 3/2006 Lee ............................... 345/212

(Continued)

FOREIGN PATENT DOCUMENTS

CN 101273394 9/2008
JP 2007-193305 8/2007

(Continued)

OTHER PUBLICATIONS

International Search Report mailed on Jun. 7, 2010 in International Application No. PCT/KR2009/005732.

*Primary Examiner* — Alexander Eisen
*Assistant Examiner* — Nan-Ying Yang
(74) *Attorney, Agent, or Firm* — Kile Park Reed & Houtteman PLLC

(57) ABSTRACT

A display driving system includes a timing control section having an LVDS receiving unit for receiving data signals, a data processing unit for temporarily storing the data signals, processing the data signals and outputting processed data signals, a timing generation unit for generating clock signals and timing control signals, and a transmission unit for transmitting the data signals; and a panel driving section having row driving units for sequentially emitting gate signals toward a display panel and column driving units for receiving the signals transmitted through signal lines from the transmission unit and supplying the received signals to the display panel. In the timing control section, the transmission unit has driving parts which embed the clock signals between the data signals at the same level and generate and output single level transmission data.

18 Claims, 22 Drawing Sheets

(56) References Cited

U.S. PATENT DOCUMENTS

| | | | | |
|---|---|---|---|---|
| 7,105,903 | B2 | 9/2006 | Butcher et al. | |
| 7,116,306 | B2 * | 10/2006 | Lin | 345/99 |
| 8,149,253 | B2 * | 4/2012 | Lee | 345/691 |
| 2001/0015712 | A1 * | 8/2001 | Hashimoto | 345/92 |
| 2004/0227716 | A1 | 11/2004 | Lin | |
| 2007/0216630 | A1 | 9/2007 | Liao | |
| 2008/0012746 | A1 | 1/2008 | Zheng | |
| 2008/0246755 | A1 | 10/2008 | Lee | |
| 2009/0051675 | A1 * | 2/2009 | Huang | 345/204 |
| 2011/0242066 | A1 * | 10/2011 | Jeon et al. | 345/204 |

FOREIGN PATENT DOCUMENTS

| | | | |
|---|---|---|---|
| JP | 2009-163239 | | 7/2009 |
| JP | 2009-531936 | | 9/2009 |
| JP | 2009-230139 | | 10/2009 |
| KR | 10-0562860 | B1 | 3/2006 |
| KR | 10-0583631 | B1 | 5/2006 |
| KR | 10-2008-0066327 | A | 7/2008 |
| KR | 10-0883778 | | 2/2009 |
| TW | 200709129 | | 3/2007 |
| TW | 200839710 | | 10/2008 |
| WO | 2007/035015 | | 3/2007 |
| WO | WO 2007035015 | A1 * | 3/2007 |
| WO | 2007/108574 | | 9/2007 |

* cited by examiner

Transmission of Data Differential Signals and Clock Differential Signals in Conventional LVDS Transmission of Data Differential Signals and Clock Differential Signals in Conventional RSDS Transmission of Data Differential Signals Through Independent Data Signal Lines in Conventional PPDS Chain Type Transmission of Clock Differential Signals in Conventional PPDS LVDS Data
Timing Controller
10
Column Driving IC
20
20
Clock-embedded Multi-level Data Differential Signal (CLK+DATA)
2

DISPLAY DRIVING SYSTEM USING TRANSMISSION OF SINGLE-LEVEL EMBEDDED WITH CLOCK SIGNAL

BACKGROUND OF THE INVENTION

1. Field of the Invention

The present invention relates to a display driving system, and more particularly, to a display driving system using single level signaling with embedded clock signals, which includes a timing control section configured to embed a clock signal of the same level between data signals and transmit the signals to a panel driving section, and the panel driving section configured to recover the embedded clock signal from the transmitted data signals, sample data using the clock signal stabilized during a clock training interval and output image data, so that a data transmission speed is maximized, the level of signals to be transmitted and the frequency of the embedded clock signal are minimized, and impedance mismatch and EMI (electromagnetic interference) are suppressed to the minimum.

2. Description of the Related Art

These days, as the digital home appliance market is grown and the distribution of personal computers and portable communication terminals is increased, display devices as final output devices of home appliances and communication terminals are required to be light in weight and consume a small amount of power. Techniques for meeting these requirements are continuously proposed in the art. Accordingly, flat display devices, such as an LCD (liquid crystal display), a PDP (plasma display panel) and an GELD (organic electro-luminescence display), which replace the conventional CRT (cathode ray tube), have been developed and are being distributed.

Each of the flat display devices includes a timing controller which processes image data and generates a timing control signal so as to drive a panel used for displaying received image data, and column driving sections and row driving sections which drive the panel using the image data and the timing control signal transmitted from the timing controller.

In particular, recently, as display devices having a large screen size and a high resolution are demanded, a technique for transmitting data at a high speed from the timing controller to the column driving sections is required. In this regard, since electromagnetic interference (EMI) is caused by electromagnetic waves while transmitting data at a high speed, the level of a signal to be transmitted has been considerably decreased.

Under these situations, differential signal transmission schemes capable of reducing electromagnetic interference (EMI) and transmitting data at a high speed, such as mini-LVDS (low voltage differential signaling) and RSDS (reduced swing differential signaling), have been increasingly used.

FIG. 1 is a view illustrating transmission of data differential signals and clock differential signals in conventional LVDS, and FIG. 2 is a view illustrating transmission of data differential signals and clock differential signals in conventional RSDS.

Referring to FIGS. 1 and 2, the recently used mini-LVDS or RSDS has at least one data differential signal line which is connected to a timing controller 10 so as to support a desired bandwidth and a separate clock differential signal line which is configured to output a clock differential signal in synchronism with a data differential signal, and adopts a multi-drop scheme in which respective column driving sections 20 share the data differential signal line and the clock differential signal line.

While the multi-drop scheme has advantages in that the timing controller 10 can be used irrespective of the number of outputs depending upon a resolution, that is, the number of the column driving sections 20, it encounters a problem in that signal distortion by reflection waves is caused and electromagnetic interference (EMI) increases due to impedance mismatch occurring at points where the data differential signal and the clock differential signal are supplied to the respective column driving sections 20, and in that an operation speed is limited due to a large load applied to the clock differential signal.

In order to overcome the problem caused in the multi-drop scheme, PPDS (point-to-point differential signaling), in which data differential signals are separately supplied to respective column driving sections and a clock differential signal is shared by the column driving sections, has been proposed in the art.

FIG. 3 is a view illustrating transmission of data differential signals through independent data signal lines in conventional PPDS, and FIG. 4 is a view illustrating chain type transmission of clock differential signals in another conventional PPDS.

Referring to FIG. 3, in PPDS, an independent data line is formed between a timing controller 10 and each column driving section 20 so that data differential signals are separately supplied to respective column driving sections 20. Therefore, impedance mismatch, electromagnetic interference (EMI) and overloading of a clock differential signal that can otherwise be caused in the multi-drop scheme can be overcome.

In the PPDS, the clock differential signal should be transmitted at a high speed. In this regard, because the PPDS shown in FIG. 3 is configured to share the clock differential signal, an operation speed is limited when a load applied to the clock differential signal is substantial. Hence, as shown in FIG. 4, a signal transmission scheme is used, in which a clock differential signal is supplied to the respective column driving sections 20 in a chain type. In this case, a problem is caused in that sampling of data is not properly implemented due to clock delay occurring between the column driving sections 20.

Further, as display devices trend toward a large screen size and a high resolution and the number of column driving sections increases accordingly, the PPDS scheme encounters a problem in that the numbers of data and clock signal lines increase at the same rate, connection of entire signal lines is complicated, and a high manufacturing cost results.

FIG. 5 is a view illustrating a conventional AiPi (advanced intra-panel interface).

Referring to FIG. 5, the AiPi has recently been suggested in which data and clock signals are distinguished by multi-levels and data differential signals with clock signals embedded therebetween are transmitted from a timing controller to column driving sections through independent respective signal lines. Therefore, the number of signal lines can be significantly decreased, and electromagnetic interference (EMI) is reduced. Also, since the operation speed and the resolution of a panel are increased despite the decrease in the number of signal lines, it is possible to solve the problems caused by skew or jitter occurring between the data and clock signals while transmitting signals at a high speed.

As a consequence, as described above, in the multi-drop scheme such as the conventional mini-LVDS and RSDS for transmitting data at a high speed from the timing controller to the column driving sections, a problem is caused in that impedance mismatch and overloading of the signal line for transmitting the clock differential signal occur. In the conventional PPDS, while data differential signals and clock differential signals are separately supplied to respective column driving sections so as to overcome the problem caused in the multi-drop scheme, as display devices trend toward a large screen size and a high resolution, the number of signal lines increases compared to the multi-drop scheme, whereby the complexity of signal lines for connecting the timing controller and the column driving sections is increased and a lot of costs is incurred.

Moreover, in the recently proposed AiPi transmission scheme, while signals are transmitted by embedding clock signals between data to decrease the number of signal lines and prevent the occurrence of skew between the data and clock signals, since the embedded clock signals are transmitted to constitute multi-level signals by having a level greater or less than data signals, problems are caused in that it is impossible to minimize the level of signals to be transmitted and reduction of electromagnetic interference (EMI) is poor.

As a consequence, an interface for transmitting data at a high speed between a timing controller and column driving sections, which can decrease the number of signal lines for transmitting data differential signals and clock differential signals, minimize electromagnetic interference (EMI), and prevent the occurrence of skew and jitter between signal lines, is keenly demanded in the art.

SUMMARY OF THE INVENTION

Accordingly, the present invention has been made in an effort to solve the problems occurring in the related art, and an object of the present invention is to provide a display driving system using single level signaling with embedded clock signals, in which a clock signal of the same level is embedded between data signals in a timing control section and is transmitted through an independent data signal line to each panel driving section in the type of a single level signal, and the clock signal is recovered in the panel driving section, data signal is sampled and image data is outputted to a panel, so that a data transmission speed can be maximized and the level of signals to be transmitted and the frequency of the embedded clock signal can be minimized.

Another object of the present invention is to provide a display driving system using single level signaling with embedded clock signals, which can minimize impedance mismatch and EMI (electromagnetic interference) caused due to multi-drop type signaling of data signals and clock signals in the conventional art, decrease the number of signal lines, and prevent the occurrence of skew and jitter between signals.

In order to achieve the above objects, according to one aspect of the present invention, there is provided a display driving system including a timing control section having an LVDS receiving unit for receiving data signals, a data processing unit for temporarily storing the data signals, processing the data signals and outputting processed data signals, a timing generation unit for generating clock signals and timing control signals, and a transmission unit for transmitting the data signals; and a panel driving section having row driving units for sequentially emitting gate signals toward a display panel and column driving units for receiving the signals transmitted through signal lines from the transmission unit and supplying the received signals to the display panel, wherein, in the timing control section, the transmission unit has driving parts which embed the clock signals between the data signals at the same level and generate and output single level transmission data.

According to another aspect of the present invention, the column driving unit includes a clock recovery circuit which recovers the clock signal embedded between the data signals and having a transmission speed lower than that of the data signals and generates the received clock signal to be used for sampling data signals, and a receiving part which samples and outputs data signals included in the transmission data at a transition time (a rising edge or a falling edge) of the received clock signal.

BRIEF DESCRIPTION OF THE DRAWINGS

The above objects, and other features and advantages of the present invention will become more apparent after a reading of the following detailed description taken in conjunction with the drawings, in which.

DETAILED DESCRIPTION OF PREFERRED EMBODIMENTS

Figure 1:
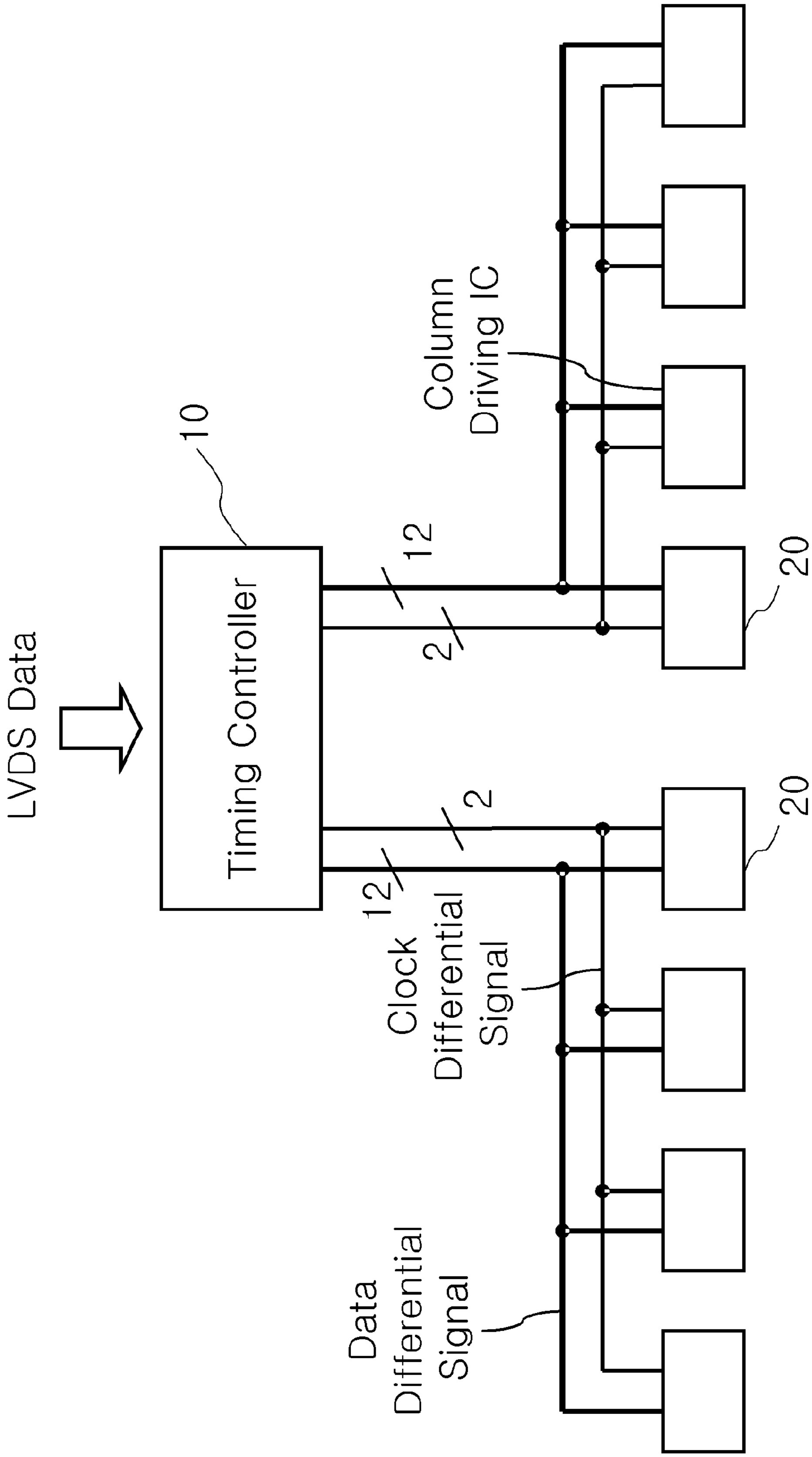
FIG. 1 is a view illustrating transmission of data differential signals and clock differential signals in conventional LVDS.
Figure 2:
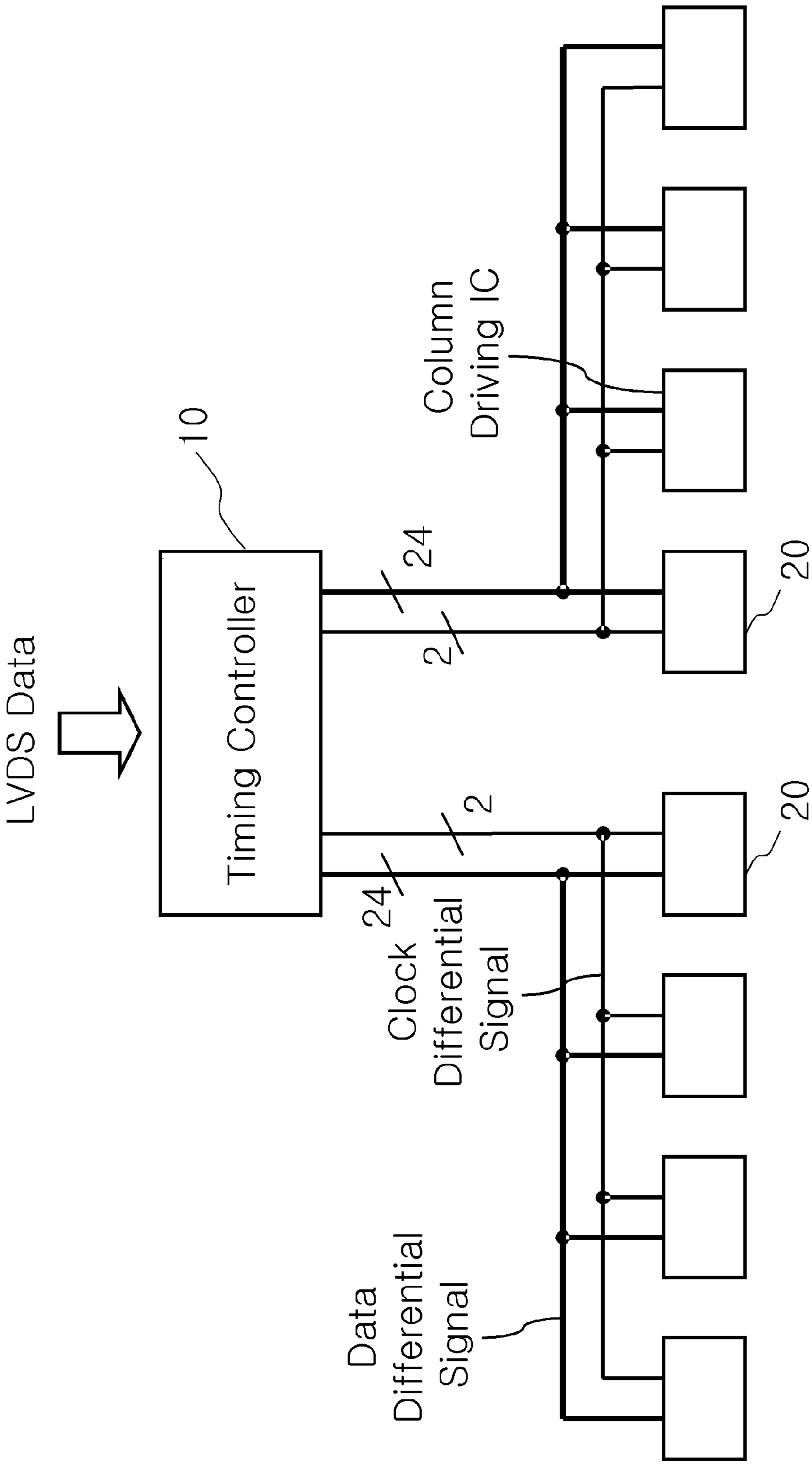
FIG. 2 is a view illustrating transmission of data differential signals and clock differential signals in conventional RSDS.
Figure 3:
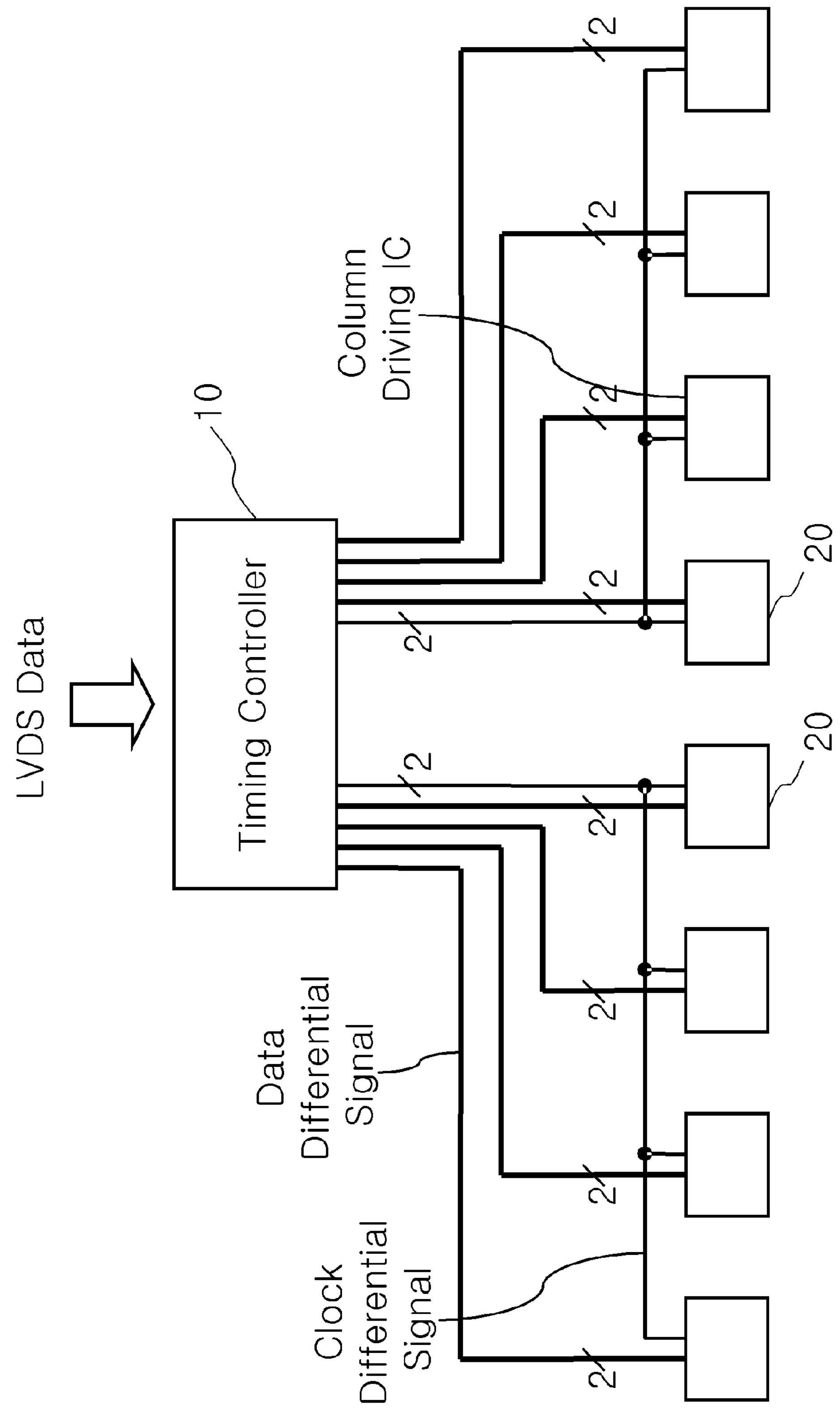
FIG. 3 is a view illustrating transmission of data differential signals through independent data signal lines in another conventional PPDS.
Figure 4:
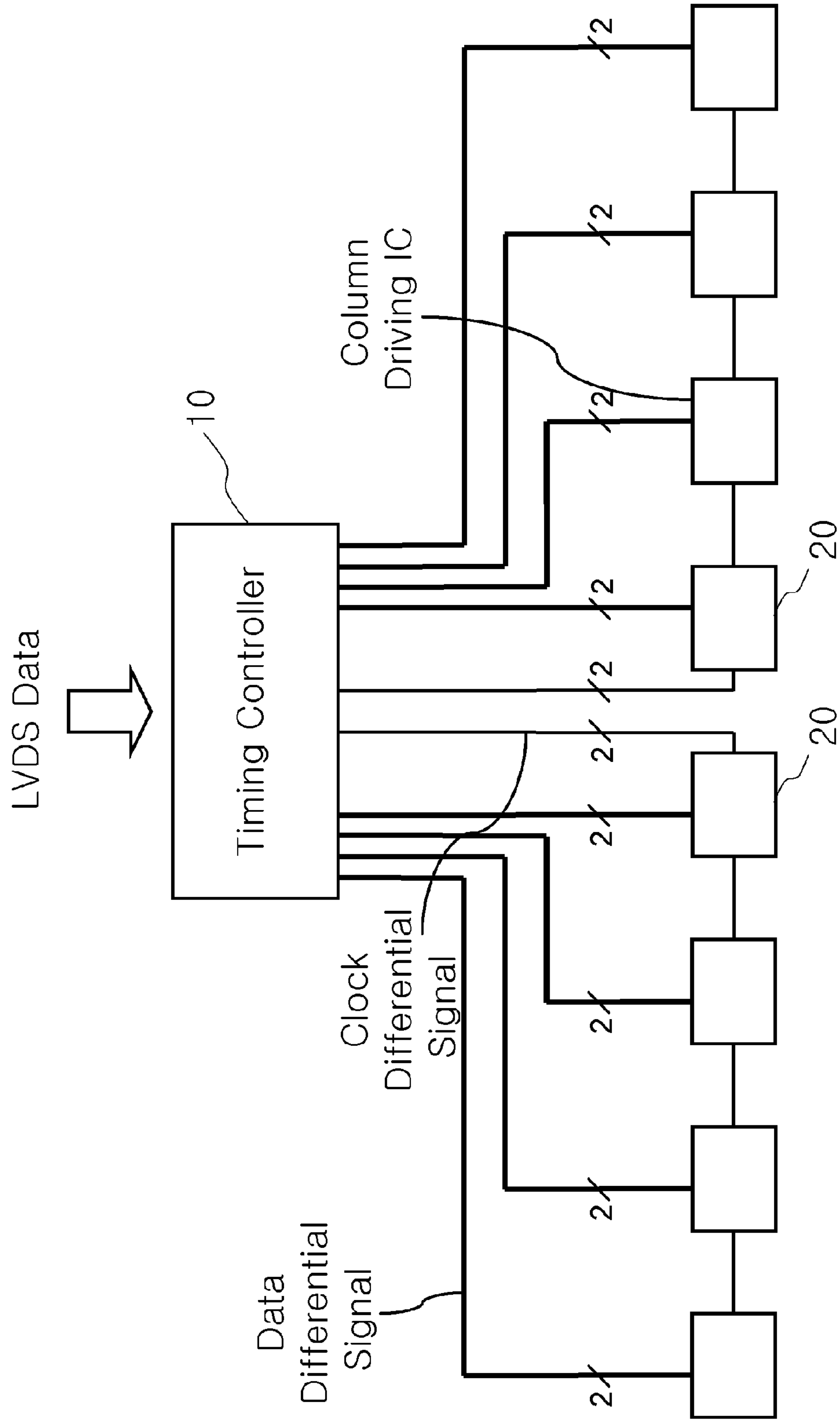
FIG. 4 is a view illustrating chain type transmission of clock differential signals in conventional PPDS.
Figure 5:
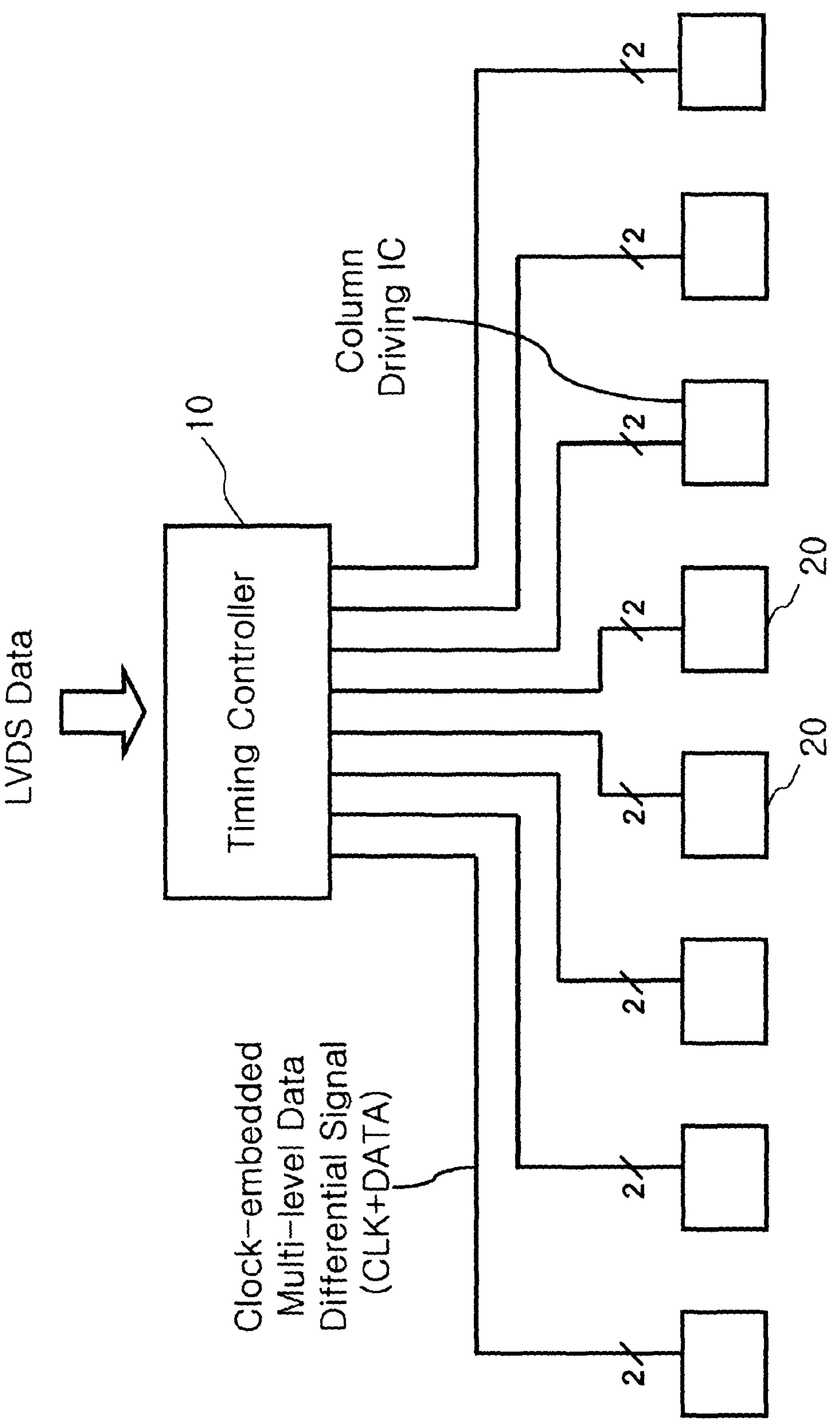
FIG. 5 is a view illustrating a conventional AiPi.

Reference will now be made in greater detail to preferred embodiments of the invention, examples of which are illustrated in the accompanying drawings. Wherever possible, the same reference numerals will be used throughout the drawings and the description to refer to the same or like parts.

Figure 6:
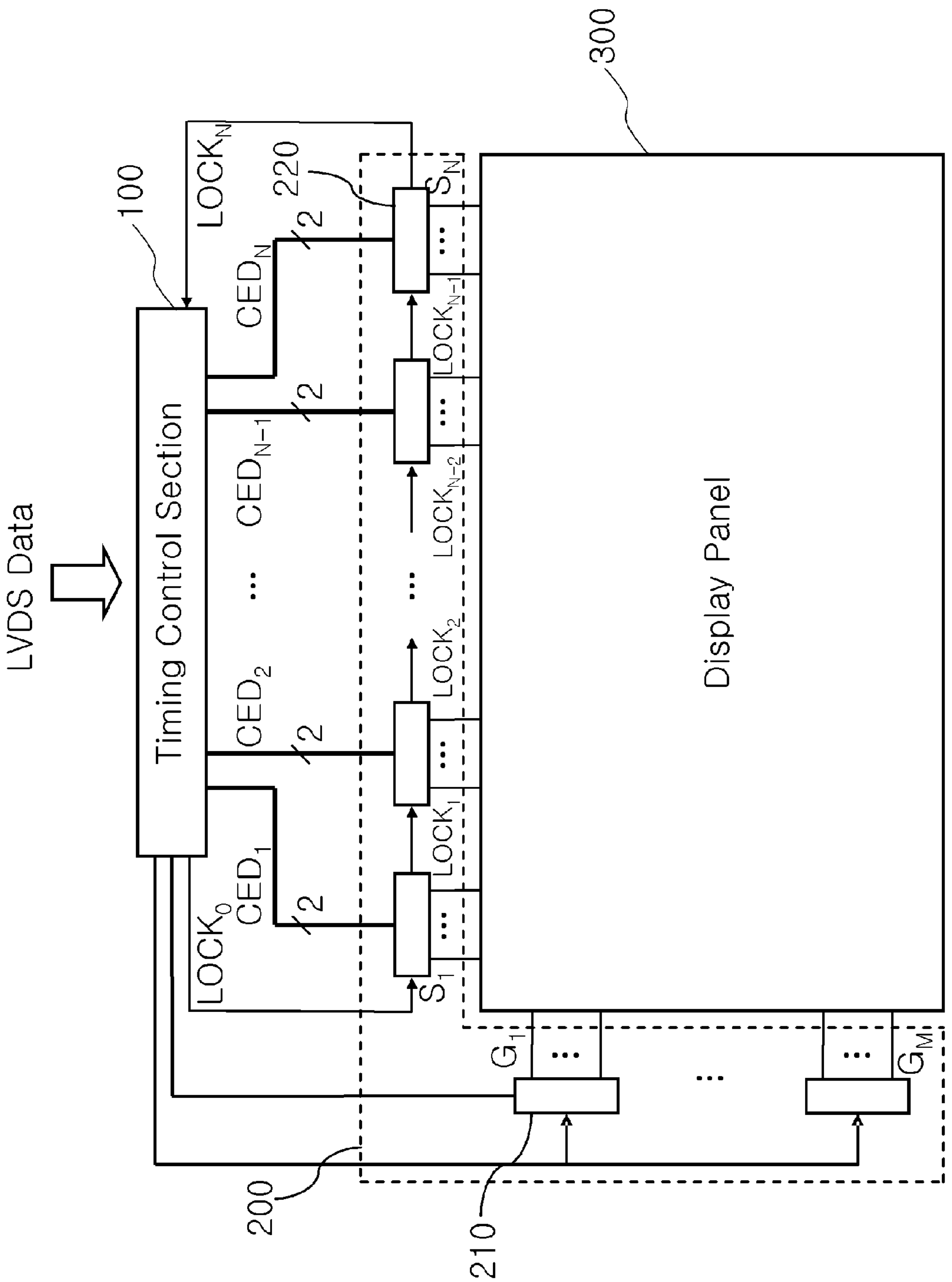
FIG. 6 is a view illustrating the configuration of a display driving system using single level signaling with embedded clock signals according to the present invention.
Figure 7:
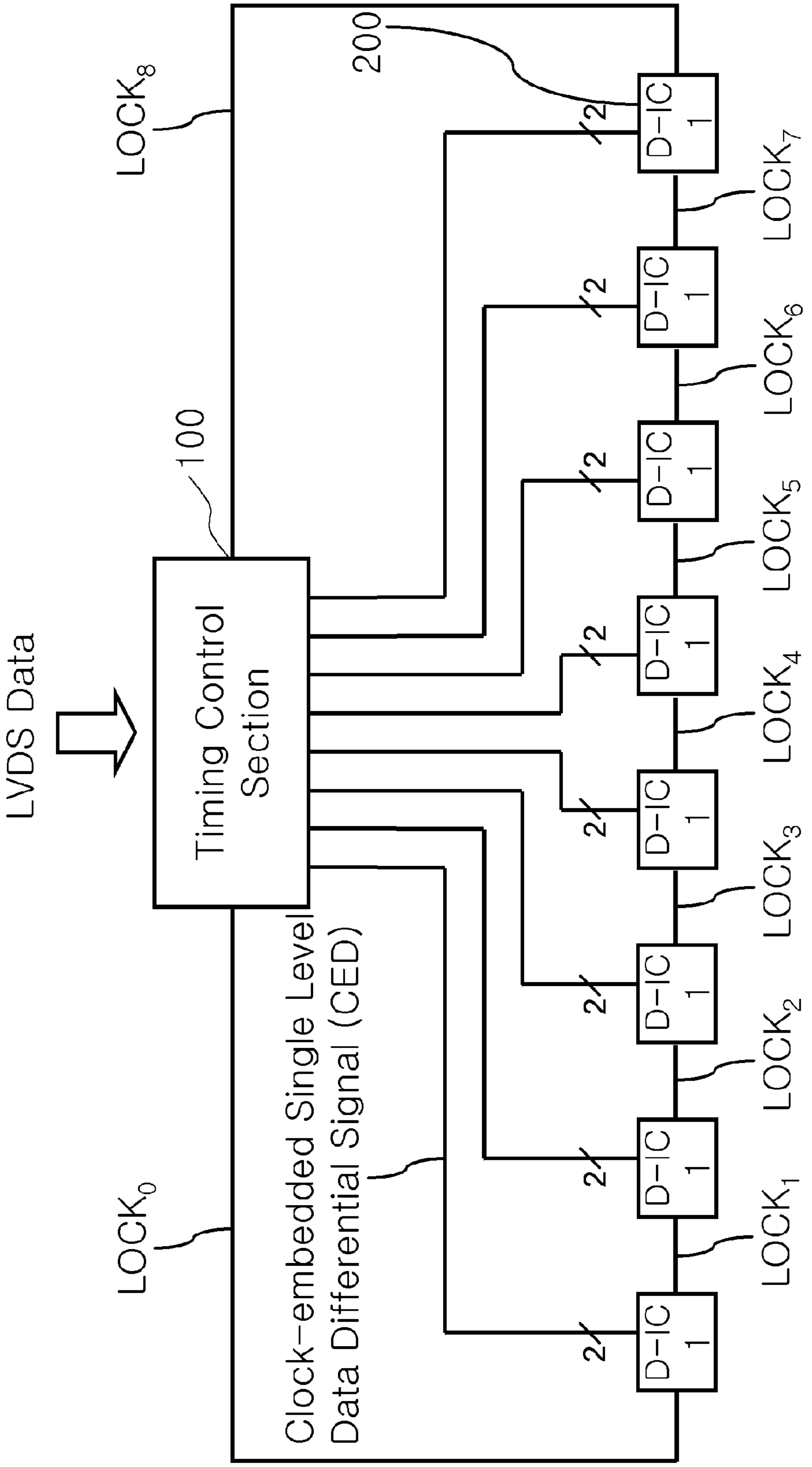
FIG. 7 is a schematic view illustrating a state in which data composed of single level clock signal and data signal is transmitted through a single signal line according to the present invention.

FIG. 6 is a view illustrating the configuration of a display driving system using single level signaling with embedded clock signals according to the present invention, and FIG. 7 is a schematic view illustrating a state in which clock embedded data (CED) signal composed of single level clock signal and data signal is transmitted through a single signal line according to the present invention.

In the present invention, clock embedded data (CED) signal may be a first clock embedded data (CED1) signal comprised in the form of clock signal or a second clock embedded data (CED2) signal in which clock signals are embedded between data signals.

Referring to FIGS. 6 and 7, a display driving system using single level signaling with embedded clock signals according to an embodiment of the present invention includes a timing control section 100 configured to receive data signals in the form of an LVDS, embed each of clock signals between the data signals in such a way as to have the same level and transmit single level clock embedded data (CED) signal, and a panel driving section 200 configured to receive the clock embedded data (CED) signal, distinguish clock signals and data signals using received clock signals that are recovered during a clock training interval, sample data and transmit the signals to a display panel 300.

The panel driving section 200 is composed of row driving units 210 which sequentially emit gate signals $G_1$ through $G_M$ to the display panel 300 and column driving units 220 which supply source signals $S_1$ through $S_N$ to be displayed.

The timing control section 100 transmits only a clock embedded data (clock embedded data, CED) signal as a differential pair, in which a clock signal is embedded at the same level between the data signals, to each column driving unit 220 of the panel driving section 200 via one signal line.

Before transmitting a second clock embedded data (CED2), the timing control section 100 transmits a first clock embedded data (CED1) signal comprising only in the form of clock signal to start clock training, and thereafter, transmits to the panel driving section 200 a signal $LOCK_0$ informing that the clock signal is stabilized. The column driving units 220 of the panel driving section 200 recover received clock signals to be used for sampling data signals in response to the first clock embedded data (CED1) signal transmitted during the clock training interval, after LOCK signals inputted from the timing control section 100 or other column driving units 220 are in an “H” state (a logic high state). If the received clock signals are stabilized, LOCK signals $LOCK_1$ through $LOCK_N$ are outputted in the “H” state. That is to say, after a LOCK signal $LOCK_0$ informing that clock signals are stabilized is inputted in the “H” state from the timing control section 100, if received clock signals are stabilized, the column driving units 220 sequentially output the LOCK signals $LOCK_1$ through $LOCK_{N-1}$ in the “H” state to next column driving units 220.

The timing control section 200, which is finally inputted with the signal $LOCK_N$ of the “H” state from the panel driving section 200, ends the clock training and starts to transmit the second clock embedded data (CED2) signal. If the signal $LOCK_N$ changes to an “L” state (a logic low state) while transmitting the second clock embedded data (CED2) signal, the timing control section 100 immediately starts the clock training and continues the clock training until the signal $LOCK_N$ becomes the “H” state. Also, after the signal $LOCK_N$ becomes the “H” state, the timing control section 100 can interrupt the second clock embedded data (CED2) signal transmission and start the clock training as the occasion demands.

Figure 8:
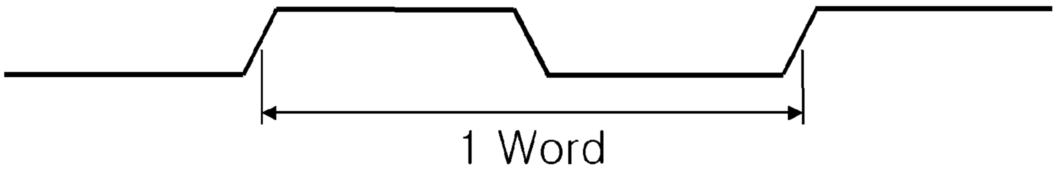
FIG. 8 is an exemplary view showing single level signals in which a clock signal is embedded between data signals during a clock training interval according to the present invention.
Figure 9:
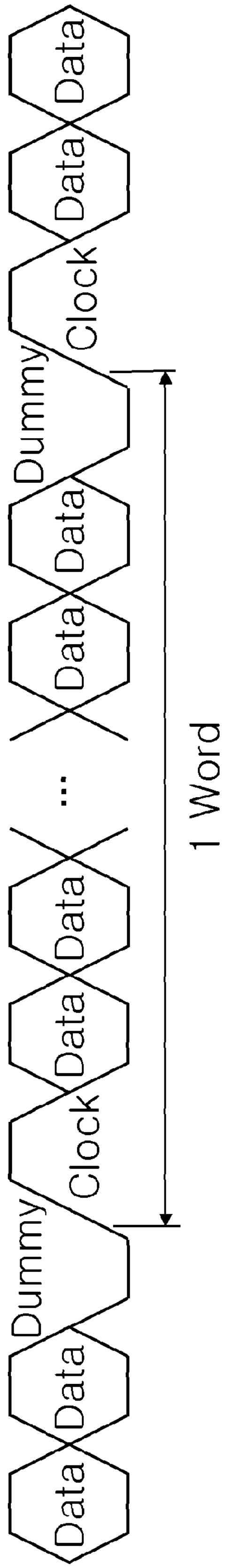
FIG. 9 is an exemplary view showing single level signals in which a clock signal is embedded between data signals during a data transmission interval according to the present invention.
Figure 10:
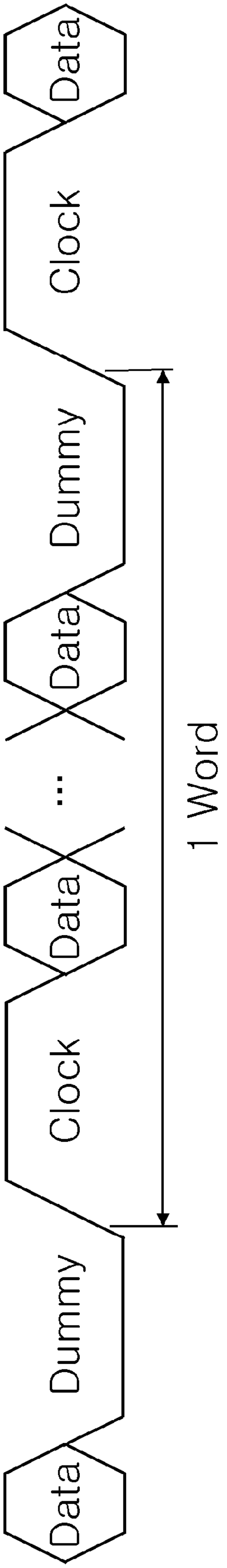
FIG. 10 is another exemplary view showing single level signals in which a clock signal is embedded between data signals during a data transmission interval according to the present invention.
Figure 11:
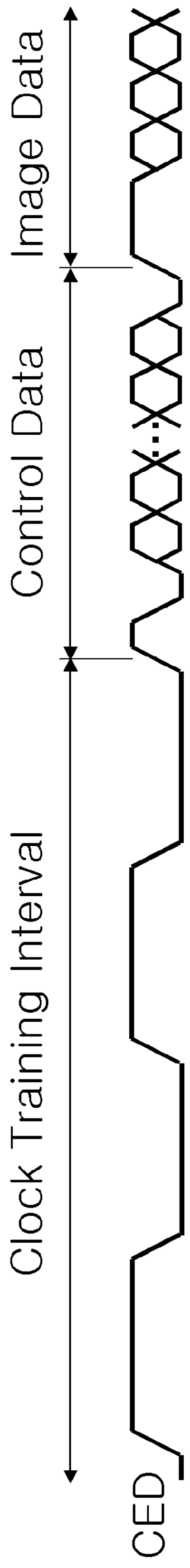
FIG. 11 is an exemplary view showing a protocol of single level signals in which a clock signal is embedded between data signals according to the present invention.
Figure 12:
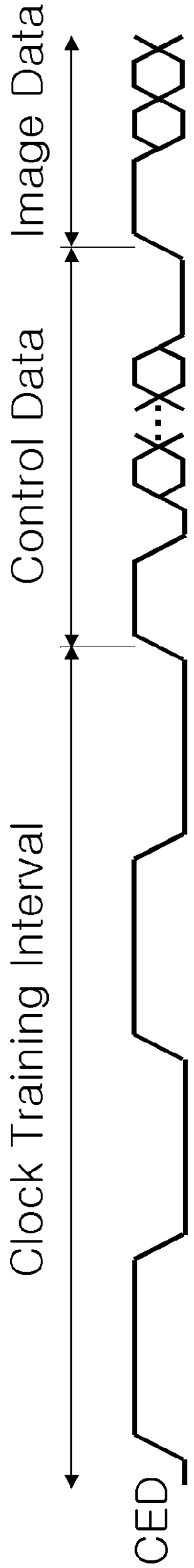
FIG. 12 is another exemplary view showing a protocol of single level signals in which a clock signal is embedded between data signals according to the present invention.

FIG. 8 is an exemplary view showing the first clock embedded data (CED1) signal during a clock training interval according to the present invention, FIGS. 9 and 10 are exemplary views each showing the second clock embedded data (CED2) signal in which a clock signal is embedded between data signals during a data transmission interval according to the present invention, and FIGS. 11 and 12 are exemplary views each showing a protocol of the second clock embedded data (CED2) signal in which a clock signal is embedded between data signals according to the present invention.

Referring to FIGS. 8 and 9, clock embedded data (CED) signal is constructed by inserting a clock signal of the same level between data signals and inserting a dummy signal between a data signal and the clock signal so as to represent the rising edges of the transition times of the inserted clock signal, as a signaling scheme that can be used in the interface between the timing control section 100 and the column driving units 220. At this time, in order to ease design of a circuit, the periods of the dummy signal and the clock signal can be increased as shown in FIG. 10.

Since the frequency of the clock signal embedded between the data signals is remarkably lower than the frequency of the data signals, the panel driving section 200 generates a received clock signal used for sampling data signals, by employing a clock recovery circuit 233 which uses a delay locked loop (DLL) or a phase locked loop (PLL).

The column driving unit 220 cannot distinguish the clock signal and the dummy signal from the data signals in the signaling scheme in which the dummy signal is inserted to represent the rising edges of the clock signal. Therefore, a transmission unit 140 provided in the timing control section 100 transmits the first clock embedded data (CED1) signal comprised in the form of clock signal during the clock training interval of an initial transmission stage, as shown in FIGS. 11 and 12.

Accordingly, each column driving unit 220 provided in the panel driving section 200 generates a received clock signal through the clock recovery circuit 233 using the first clock embedded data (CED1) signal comprised in the form of clock signal. The received clock signal can be constructed as a multi-phase clock signal having a transmission rate lower than the data signal or a multi-phase clock signal having the same frequency as the data signal.

A receiving part 230 of the column driving unit 220 samples the second clock embedded data (CED2) signal transmitted after the clock training interval, using the received clock signal that is stabilized during the clock training interval. In other words, if the value of a bit of a first data signal transmitted after the clock signal embedded in a first second clock embedded data (CED2) signal transmitted after the clock training interval is “0,” the first data signal is recognized as control data, and it is recognized that image data are inputted from second data signal. Because the value of a corresponding position is always “1” during the clock training interval, the receiving part 230 can recognize that the clock training interval does not end.

The panel driving section 200 is supplied with a source output enable signal SOE, a gate start pulse signal GSP, a gate output enable signal GOE and a gate start clock signal GSC that are generated by the timing control section 100, and the column driving unit 220 recovers a data signal DATA and a clock signal CLK embedded between the data signal for representing image data and displays the data signal on a line of the display panel 300 which is selected by the gate start pulse signal GSP in response to the source output enable signal SOE.

The column driving units 220 recover received clock signals from the first clock embedded data (CED1) signal transmitted from the timing control section 100 during the clock training interval, and outputs data signals. Due to this fact, not only the number of signal lines transmitted from the timing control section 100 to the column driving units 220 can be decreased, but also electromagnetic interference (EMI) can be reduced.

Figure 13:
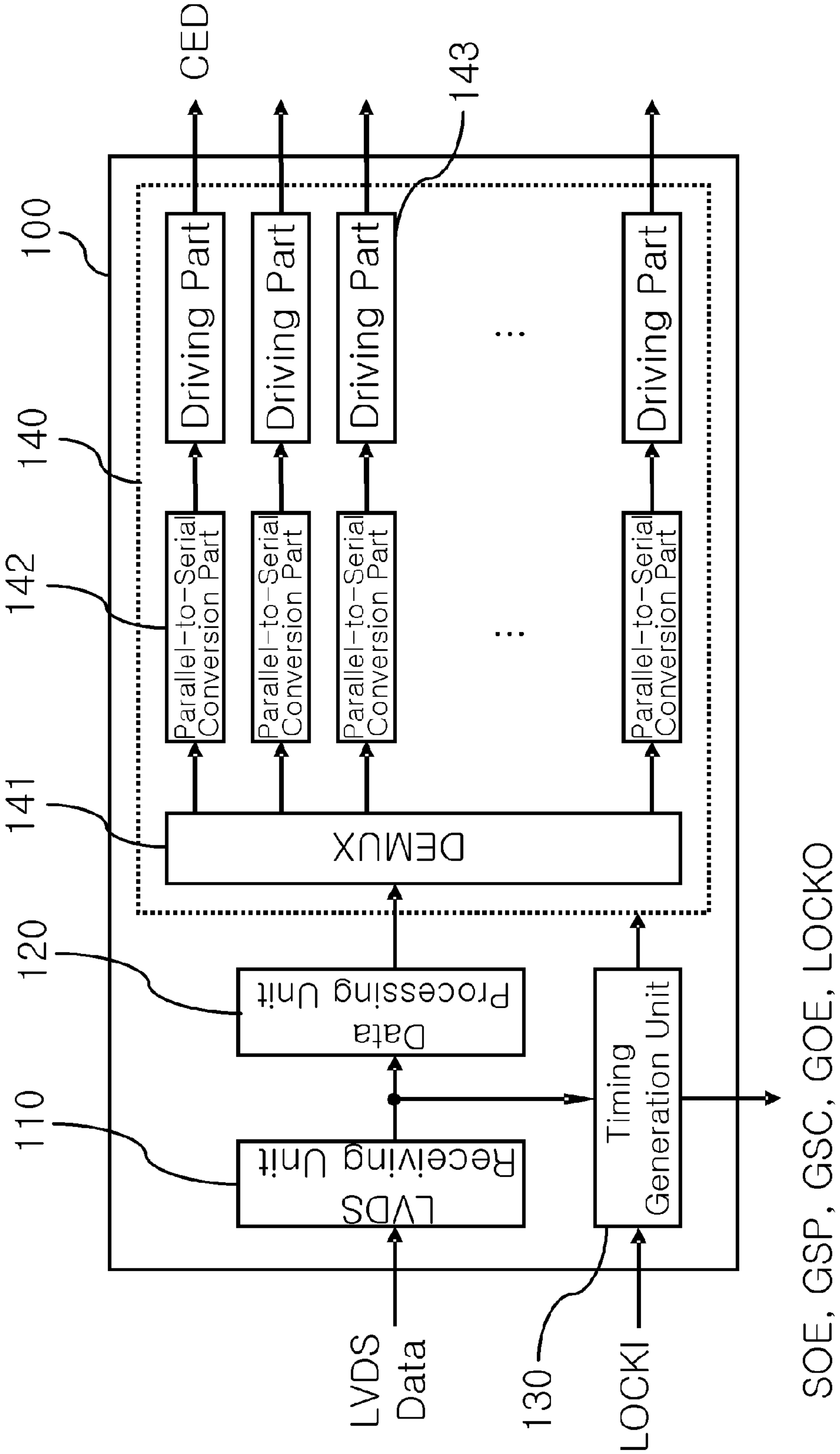
FIG. 13 is a view illustrating the configuration of a timing control section according to the present invention.
Figure 14:
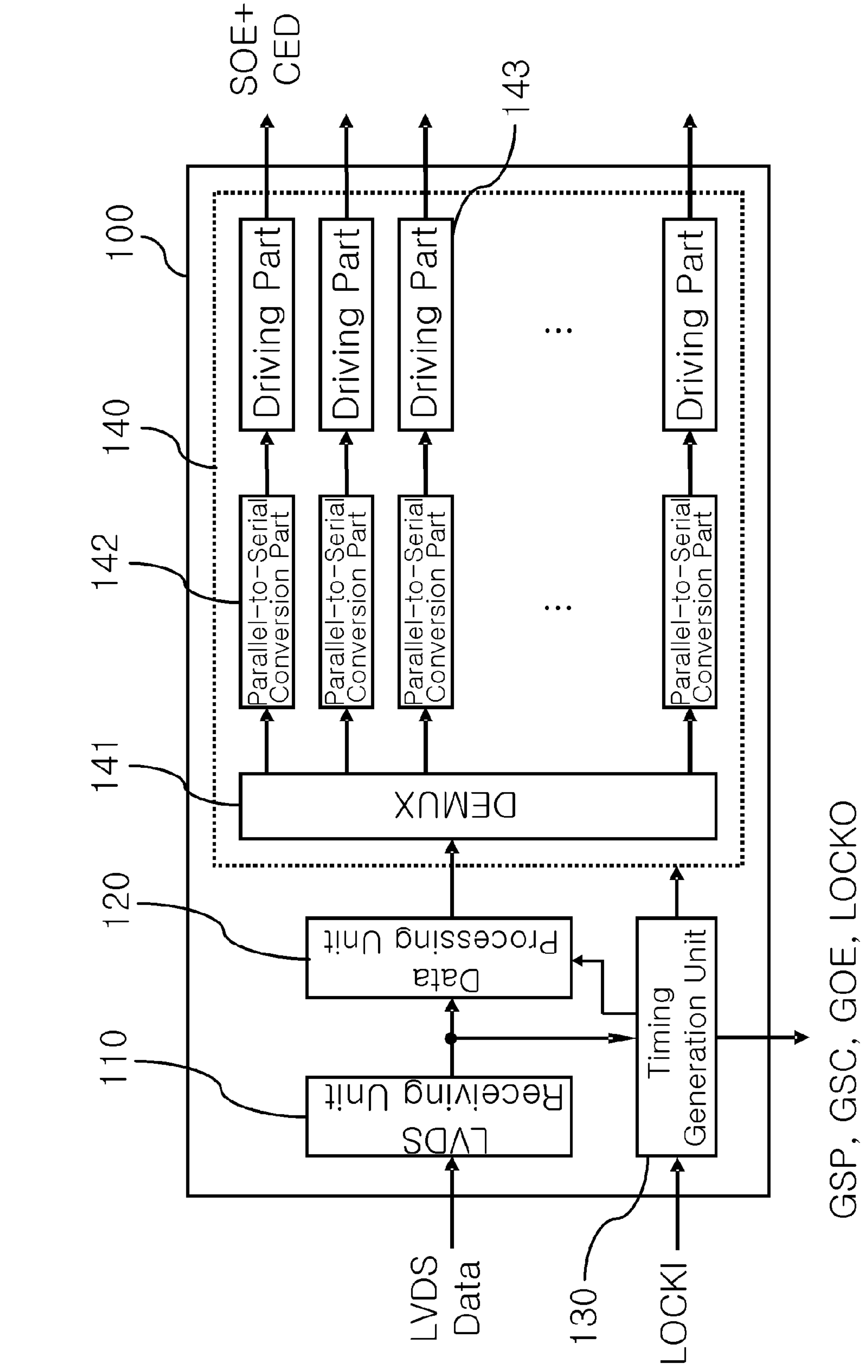
FIG. 14 is a view illustrating the configuration of another timing control section according to the present invention.

FIG. 13 is a view illustrating the configuration of a timing control section according to the present invention, and FIG. 14 is a view illustrating the configuration of another timing control section according to the present invention.

Referring to FIGS. 13 and 14, the timing control section 100 includes an LVDS receiving unit 110 which receives data signals in the form of an LVDS including image data, a data processing unit 120 which temporarily stores, processes and outputs the received data signals, a timing generation unit 130 which generates clock signals and various timing control signals, and a transmission unit 140 which is inputted with the data signals outputted from the data processing unit 120 and the clock signals outputted from the timing generation unit 130 and converts the signals into the first clock embedded data (CED1) signal comprised in the form of the clock signal or the second clock embedded data (CED2) signal in which clock signals are embedded between the data signals at the same frequency level and transmits the signals to the panel driving units.

The transmission unit 140 includes a demultiplexer (DEMUX) 141 which receives the data signals processed at the data processing unit 120 and divides and outputs data signals to be transmitted to the respective column driving units 220, parallel-to-serial conversion parts 142 which convert the data signals outputted from the demultiplexer 141, and driving parts 143 which receive the clock signals generated in the timing generation unit 130 and transmit to the respective column driving units 220 the transmission the second clock embedded data (CED2) signal embedded between the data signals at the same level. The timing control section 100 transmits the second clock embedded data (CED2) signal including the data signals made serial in the parallel-to-serial conversion parts 142 to any one of a plurality of panel driving sections 200.

The second clock embedded data (CED2) signal is a signal in which a clock signal is embedded between data signals. The level of the data signals is selected depending upon the value of 1-bit data, and the level of the embedded clock signal is selected depending upon the value of 1-bit data in the same manner as the level of the data signals.

Hence, each of the second clock embedded data (CED2) signals transmitted from the timing control section 100 includes the clock signal embedded between the data signals, and the level of the embedded clock signal is the same as the level of the data signals.

As shown in FIG. 13, in a first embodiment of the timing control section 100, the source output enable signal SOE, the gate start pulse signal GSP, the gate output enable signal GOE and the gate start clock signal GSC that are generated in the timing generation unit 130 are transmitted to the row driving units 210 of the panel driving section 200 to apply gate signals to the display panel 300, and the clock signal CLK generated in the timing generation unit 130 is transmitted to the transmission unit 140 along with the data signals received by the LVDS receiving unit 110 to become transmission data CED (=CLK+DATA) with the clock signal embedded at the same level as the data signals, the second clock embedded data (CED2) signals being then transmitted to the column driving unit 220 of the panel driving section 200.

Further, as shown in FIG. 14, in a second embodiment of the timing control section 100, only the gate start pulse signal GSP, the gate output enable signal GOE and the gate start clock signal GSC that are generated in the timing generation unit 130 are transmitted to the row driving units 210 of the panel driving section 200, and timing information for a control signal as the source output enable signal SOE generated in the timing generation unit 130, is included in the control data of the data signal DATA, so that signals (SOE+CED: SOE+CLK+DATA) in which the source output enable signal SOE, the clock signal CLK and the data signal DATA are embedded at the same level are constituted and transmitted to the column driving unit 220. In this case, a connection should of course be formed such that the timing information for the source output enable signal SOE used in the timing generation unit 130 is transmitted to the data processing unit 120.

Thus, the second clock embedded data (CED2) signals transmitted from the timing control section 100 to the column driving unit 220 can include only the clock signal CLK and the data signal DATA displaying image data to be displayed on the display panel 300, or can include the clock signal CLK, the data signal DATA and the source output enable signal SOE as a separate control signal for controlling the column driving unit 220.

Figure 15:
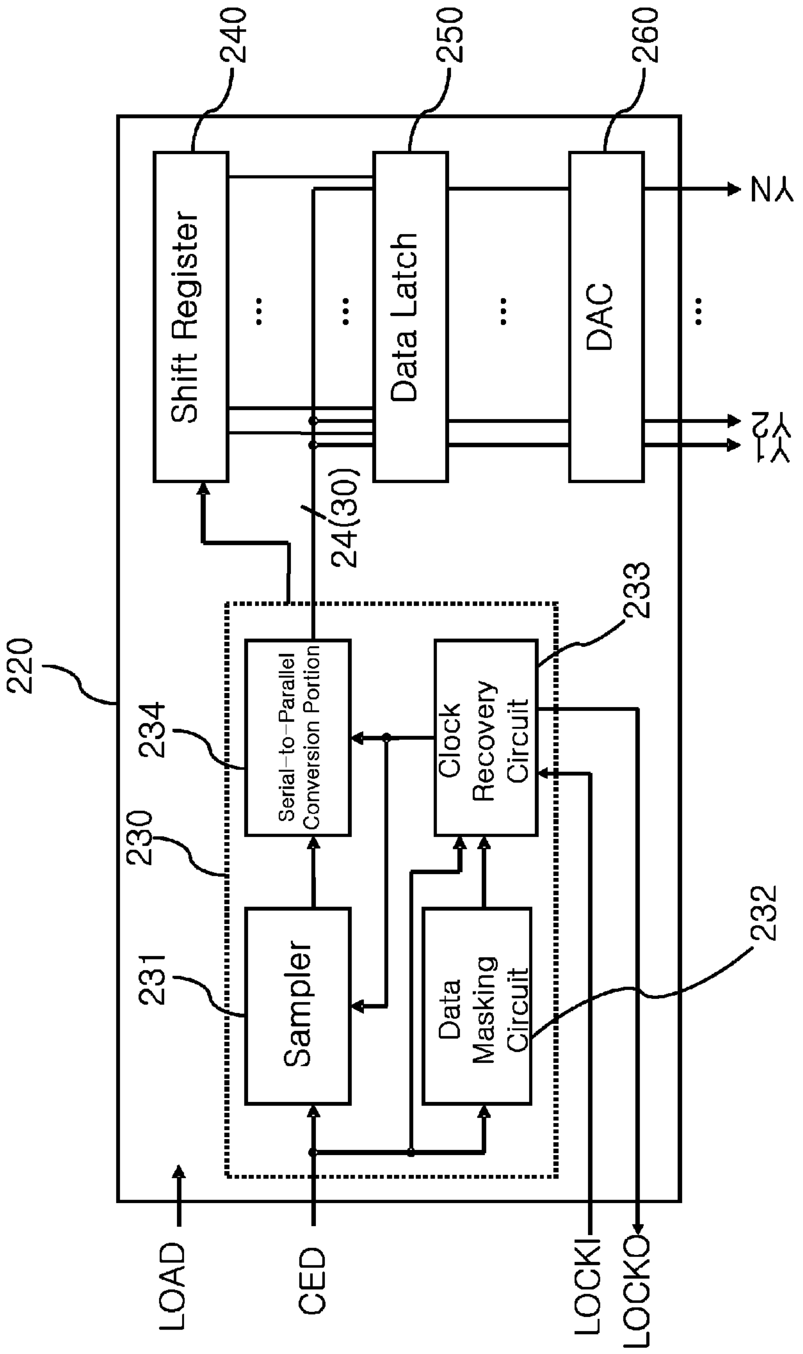
FIG. 15 is a view illustrating the configuration of a panel driving section according to the present invention.
Figure 16:
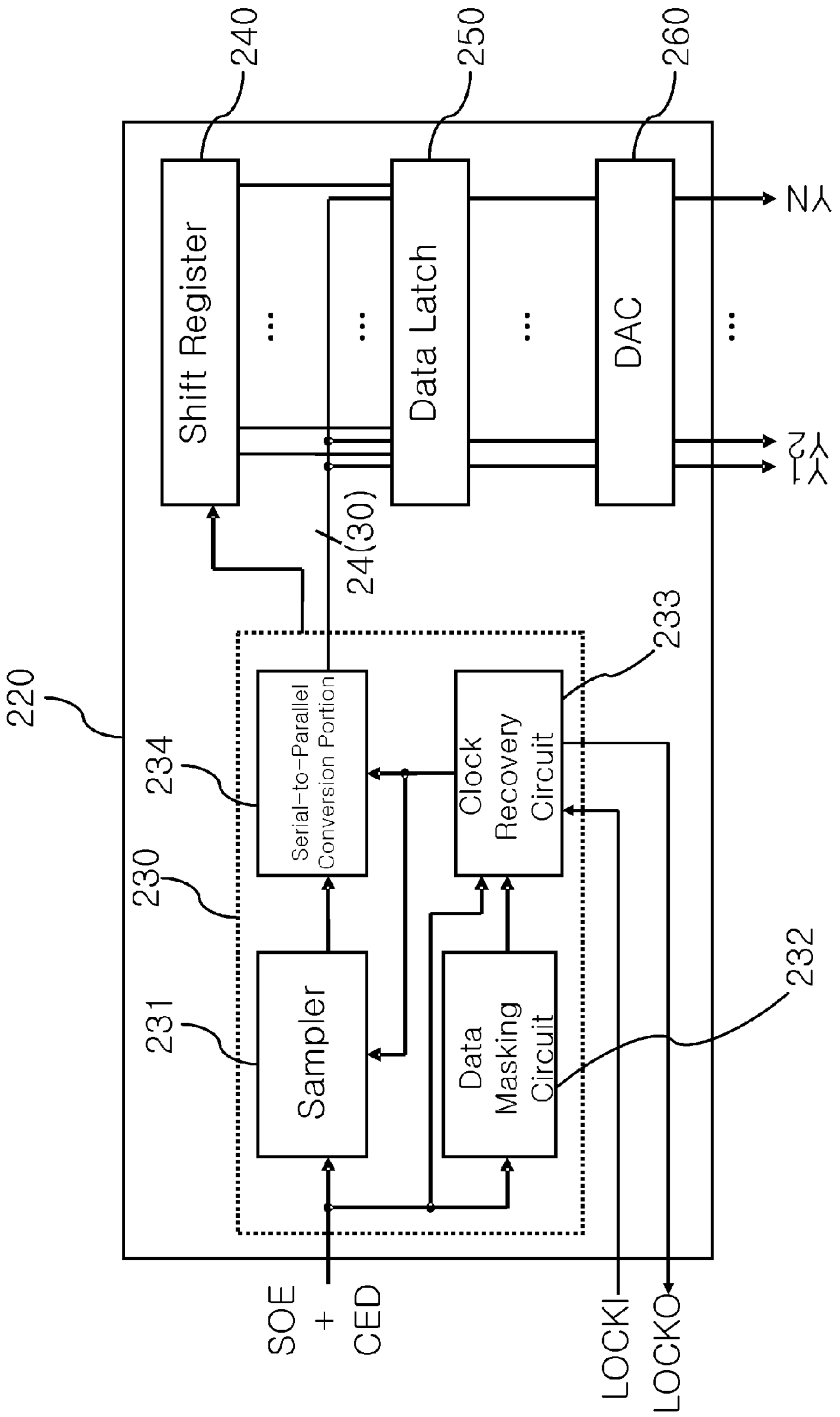
FIG. 16 is a view illustrating the configuration of another panel driving section according to the present invention.
Figure 17:
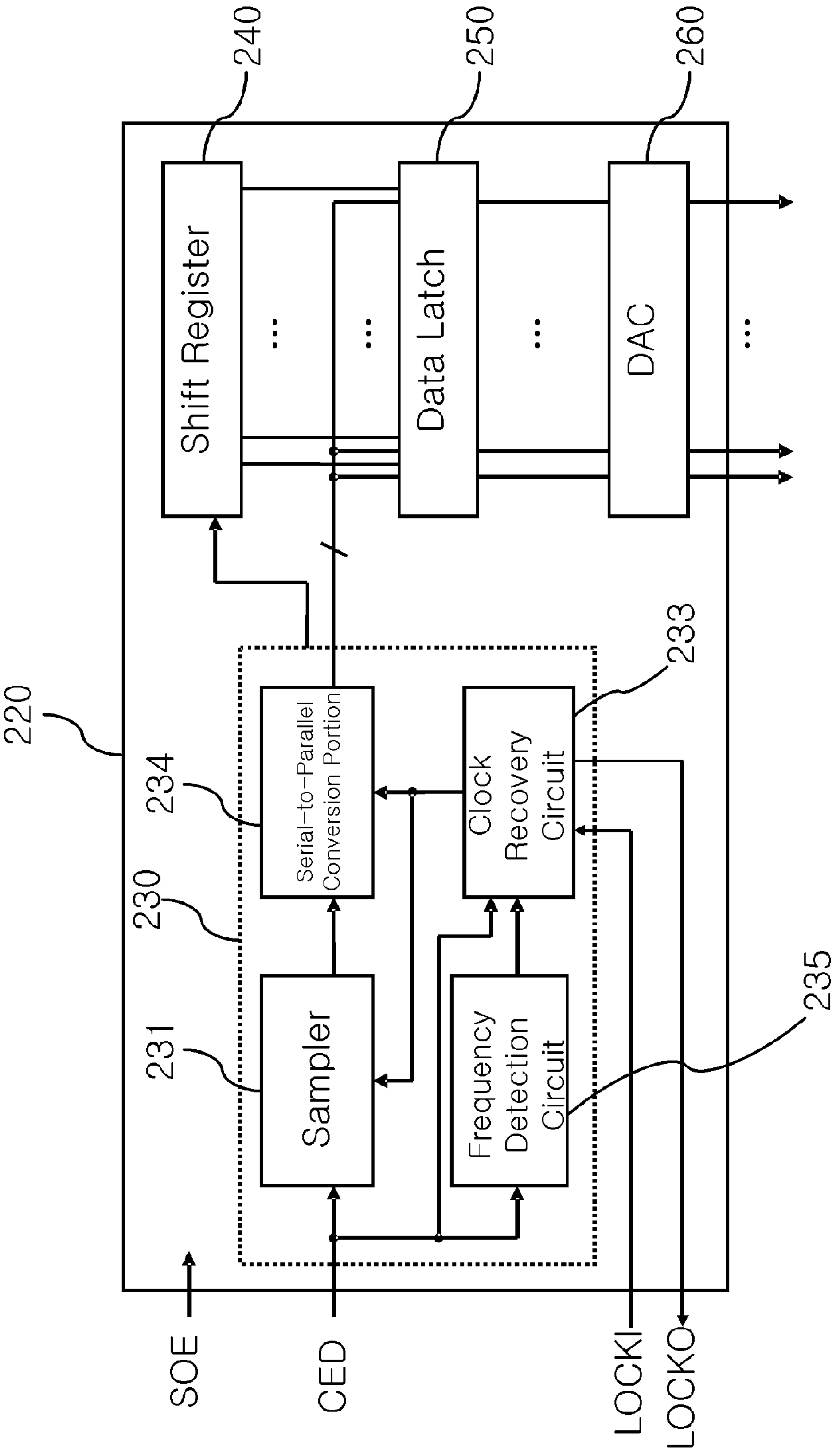
FIG. 17 is a view illustrating the configuration of still another panel driving section according to the present invention.
Figure 18:
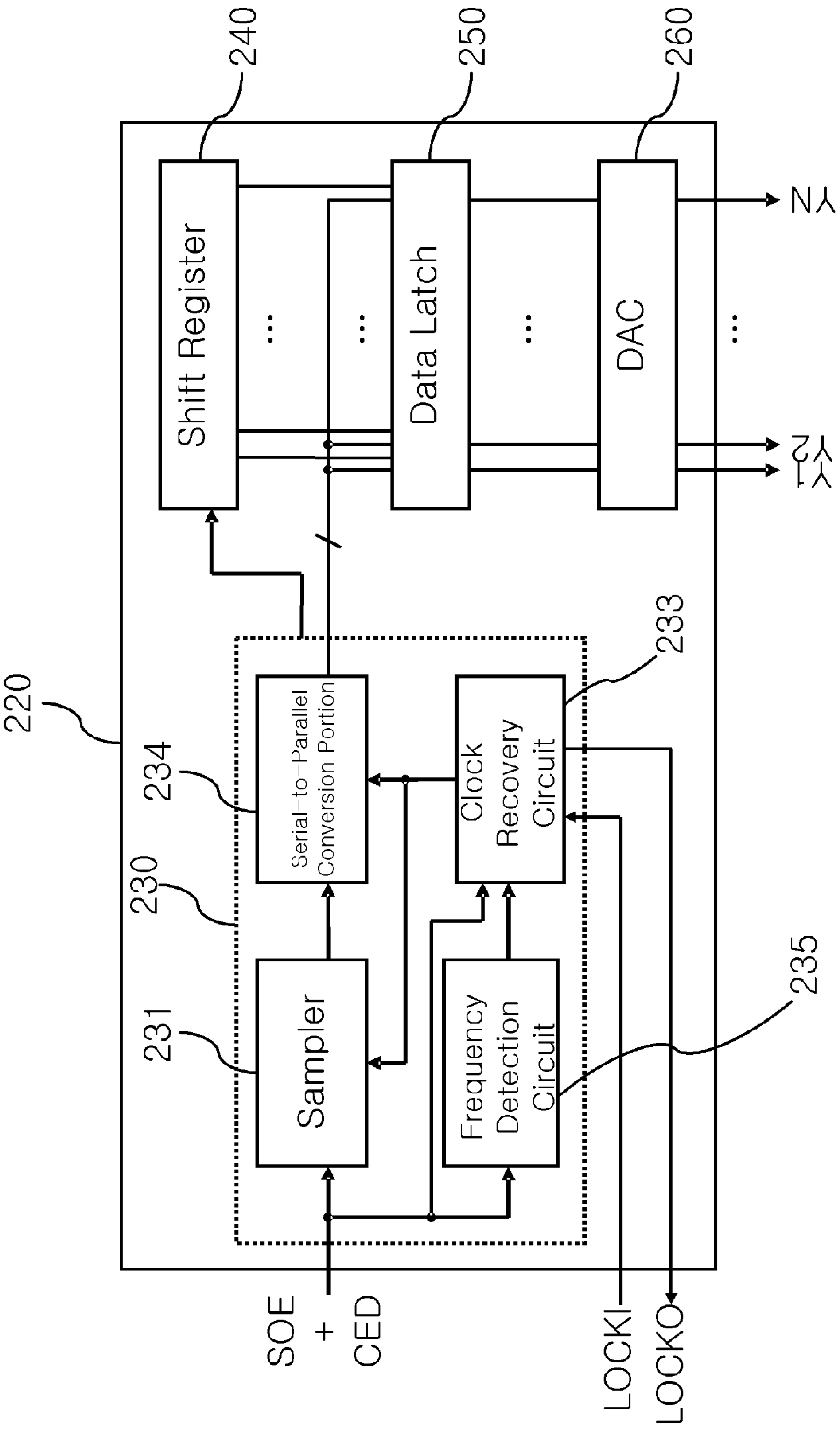
FIG. 18 is a view illustrating the configuration of yet still another panel driving section according to the present invention.

FIGS. 15 through 18 are views illustrating the configurations of a panel driving section according to the present invention. FIGS. 15 and 17 illustrate a state in which the source output enable signal SOE and the clock embedded data (CED) signal are separately transmitted from the timing control section 100, and FIGS. 16 and 18 illustrate a state in which the source output enable signal SOE and the clock embedded data (CED) signal are transmitted together from the timing control section 100.

Referring to FIGS. 15 and 16, the panel driving section 200 specifically designates the column driving unit 220 for transmitting the image data to the display panel 300. The column driving unit 220 includes a receiving part 230 which receives the clock embedded data (CED) signal, samples the second clock embedded data (CED2) signal according to a received clock signal recovered through the first clock embedded data (CED1) signal transmitted during the clock training interval and outputs data signals, shift registers 240 which sequentially shift and output shift start pulses, data latches 250 which sequentially store and then output in parallel the data signals outputted from the receiving part 230 in response to signals outputted from the shift registers 240, and DACs (digital-to-analog converters) 260 which convert and then output digital signals outputted from the data latches 250.

The receiving part 230 includes a sampler 231 which samples the data signal DATA from the second clock embedded data (CED2) signal transmitted from the timing control section 100 and outputs a resultant signal, a data masking circuit 232 which masks a data signal portion of the second embedded data (CED2) signals and transmits the CED signal to a clock recovery circuit 233, the clock recovery circuit 233 which extracts the embedded clock signal from the masked data signals and generates the received clock signal to be used for sampling the data signal, and a serial-to-parallel conversion portion 234 which converts the data signals sampled by the sampler 231 into parallel data signals.

The shift registers 240 sequentially shift and output start pulses inputted thereto. The data latches 250 sequentially store and then output in parallel the data signal converted by the serial-to-parallel conversion portion 234, in response to the output signals of the shift registers 240. The DACs 260 convert the signals outputted from the data latches 250 into analog signals Y1, Y2 through YN and supply the converted signals to the display panel 300.

Referring to FIGS. 17 and 18, the receiving part 230 may include a sampler 231 which receives the clock embedded data (CED) signals transmitted from the timing control section 100 and samples the data signal DATA, a clock recovery circuit 233 which generates the received clock signal to be used for sampling the data signal from the clock signal of the received clock embedded data (CED) signals, a frequency detection circuit 235 which detects the frequency of the received clock embedded data (CED) signals to use the frequency in recovering the clock signal in the clock recovery circuit 233, and a serial-to-parallel conversion portion 234 which converts the data signals sampled by the sampler 231 into parallel data signals.

FIGS. 19 through 22 are timing diagrams showing data recovery using protocols suggested in the present invention.

Figure 19:
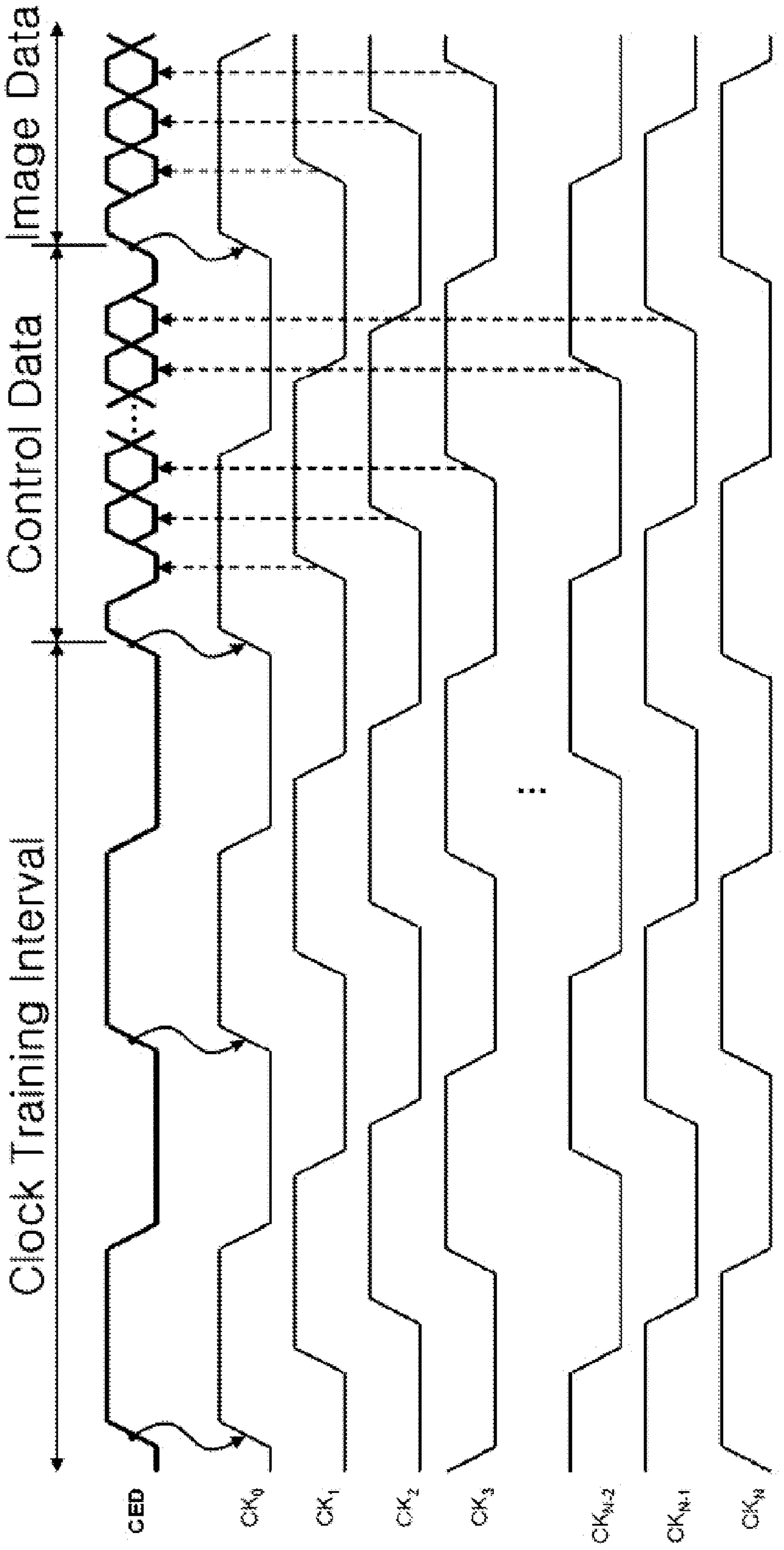
FIGS. 19 through 22 are timing diagrams showing data recovery using protocols of a single level signal according to the present invention.
Figure 20:
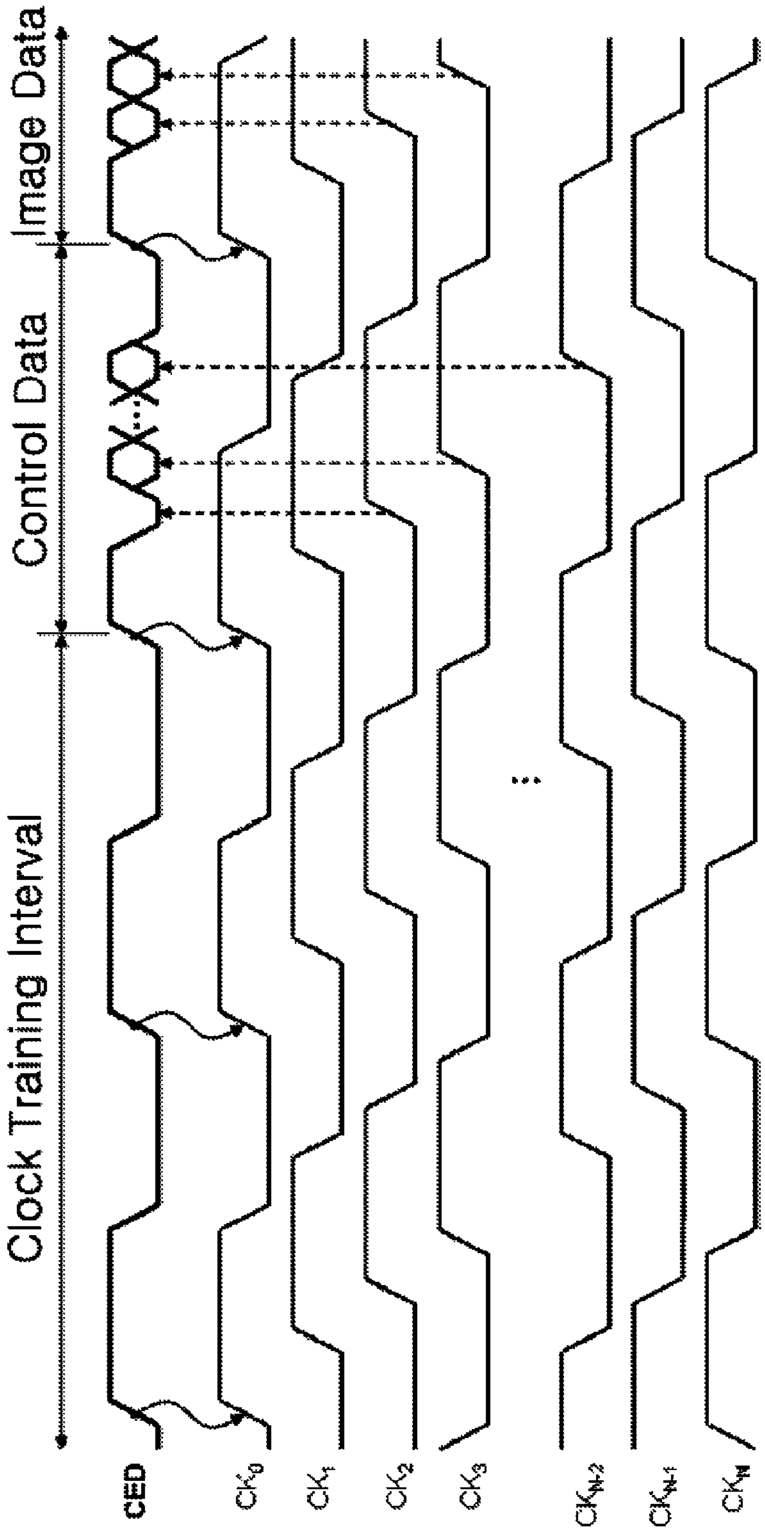

Referring to FIGS. 19 and 20, the receiving part 230 recovers multi-phase clock signals having the same frequency as the first clock embedded data (CED1) signal inputted during the clock training interval, and samples data signals using the respective multi-phase clock signals recovered in this way.

Accordingly, a received clock signal $CK_0$ having the same phase and frequency as the CED signal inputted during the clock training interval is recovered in synchronism with the rising edge of the first clock embedded data (CED1) signal, and a plurality of received clock signals $CK_1$ through $CK_N$ that are the same in frequency as and only different in phase from the received clock signal $CK_0$ are generated.

If the value of a bit of a first data signal next to the clock signal of a first second clock embedded data (CED2) signal transmitted after the clock training interval is "0," the data signal is recognized as control data for controlling the column driving unit 220, and it is recognized that image data are inputted from second data signal. Therefore, the values of respective control data or image data are sampled at the rising edges of the received clock signals $CK_0$ through $CK_N$ recovered during the clock training interval, and are outputted to the display panel 300.

Accordingly, the sequence of the respective data can be distinguished based on the fact that the data are sampled by the received clock signals having which phases.

Figure 21:
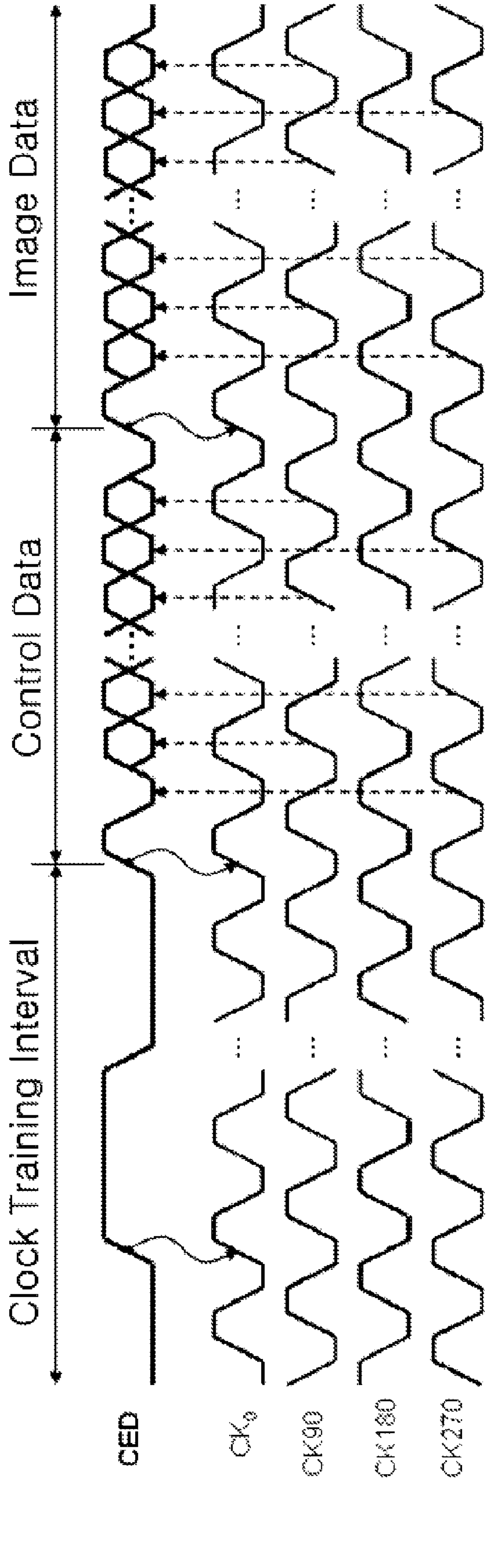
Figure 22:
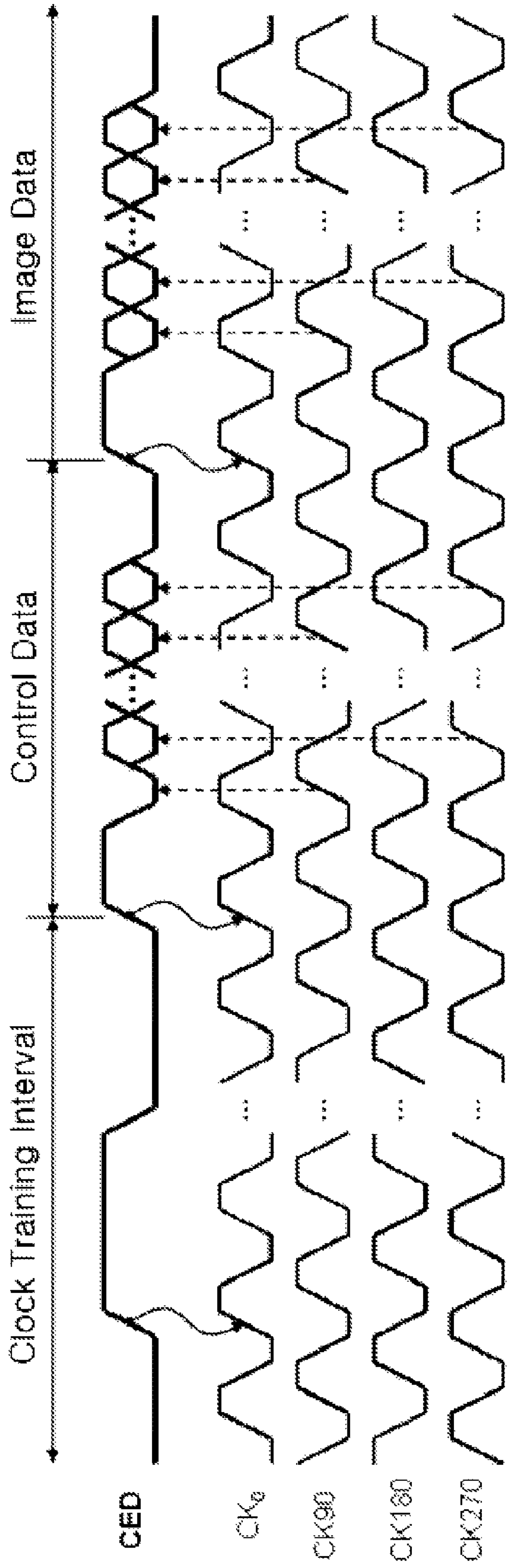

Referring to FIGS. 21 and 22, in the receiving part 230, the clock signal having higher frequency than the first clock embedded data (CED1) signal inputted during the clock training interval are recovered, the plurality of multi-phase clock signals having the same frequency as and different phases from the clock signal are recovered, and then, data signal is sampled using at least one clock signal among them.

Hence, the received clock signal $CK_0$ that is synchronized with the rising edge of the first clock embedded data (CED1) signal inputted during the clock training interval and has higher frequency than and the same phase as the data signal is recovered, and a plurality of received clock signals $CK_{90}$, $CK_{180}$ and $CK_{270}$ that are the same in frequency as and different in phase from the received clock signal $CK_0$ are generated.

The values of the control data or image data included in the data signal are sampled at the rising edges or the falling edges as the transition times of the received clock signals $CK_0$ through $CK_{270}$ recovered during the clock training interval, and are outputted to the display panel 300. In this case, in order to learn the sequence of the respective data, a separate counter circuit for counting the received clock signals used for sampling the data signal is required.

As described above, in the present invention, unlike the conventional multi-level signaling scheme in which the levels of data signals and a clock signal embedded therebetween are different from each other, data signals and a clock signal embedded therebetween are generated to have the same level so that single level signals are used. As a consequence, the level of signals to be transmitted can be minimized, the received clock signals can be generated in advance using the first clock embedded data (CED1) signal inputted during the clock training interval, and the frequency of the received clock signal can be made significantly less than the frequency of the data signal to be actually transmitted.

As a result, compared to the conventional multi-level signaling scheme, the level of signals can be considerably lowered, and correspondingly, electromagnetic interference (EMI) of the entire display driving system can be reduced. Also, compared to the case in which the data signals and the clock signal are separated from each other, the number of signal lines can be significantly decreased, and the occurrence of skew or jitter can be prevented, whereby stable operation of the display driving system at a high speed can be ensured.

As is apparent from the above description, the present invention provides advantages in that, since data signals and a clock signal embedded therebetween are produced to have the same level so as to use single level signals, the level of signals to be transmitted and recovered can be minimized, and a recovered received clock signal can be stabilized using a signal transmitted during a clock training interval, whereby the level of clock embedded data (CED) signals and the frequency of the embedded clock signal can be significantly decreased and the electromagnetic interference (EMI) of an entire display driving system can be reduced.

Also, the present invention provides advantages in that skew or jitter that can be induced when a data signal and a clock signal are separated can be prevented, whereby stable operation can be ensured even at a high speed.

Although preferred embodiments of the present invention have been described for illustrative purposes, those skilled in the art will appreciate that various modifications, additions and substitutions are possible, without departing from the scope and the spirit of the invention as disclosed in the accompanying claims.

What is claimed is:

1. A display driving system comprising:

a timing control section comprising:

an LVDS receiving unit configured to receive and output data signals;

a data processing unit configured to temporarily store the data signals outputted from the LVDS receiving unit and output the data signals to a transmission unit;

a timing generation unit configured to generate clock signals and timing control signals; and the transmission unit configured to:

receive the data signals outputted from the data processing unit and the clock signals outputted from the timing generation unit;

generate first clock signals comprising clock signals but not data signals;

generate second clock signals in which clock signals are embedded between data signals;

transmit, at a first time, the first clock signals to a panel driving section; and transmit, at a second time, the second clock signals embedded between data signals to the panel driving section; and the panel driving section comprising:

row driving units configured to sequentially emit gate signals toward a display panel; and column driving units configured to receive the first clock signals transmitted through signal lines from the transmission unit, receive the second clock signals embedded between data signals transmitted through the signal lines from the transmission unit, and supply the received signals to the display panel, wherein, in the second clock signals embedded between the data signals, the data signals and the clock signals embedded between the data signals are single and same level signals such that the amplitudes of the data signals and the clock signals embedded between the data signals are the same as they are transmitted, wherein, the first clock signals are transmitted from the transmission unit in series through the column driving units before and during transmission of the second clock signals and the data signals to the column driving units to start clock training, and the second clock signals embedded between the data signals and the data signals are transmitted through the same signal line.

2. The display driving system according to claim 1, wherein the transmission unit is configured to generate a first second clock signal in the second clock signals embedded between the data signals by inserting a dummy signal between a data signal and a clock signal so as to represent a transition time of the clock signal embedded between the data signals.

3. The display driving system according to claim 2, wherein, in the first second clock signal, a period of the dummy signal and a period of the clock signal are different than a period of the data signal.

4. The display driving system according to claim 2, wherein the second clock signals embedded between the data signals are transmitted to the column driving units in a state in which the clock signals and the timing control signals are embedded in the data signals such that amplitudes of the timing control signals are the same as the amplitudes of the clock signals.

5. The display driving system according to claim 1, wherein the timing control section is configured to start clock training by transmitting the first clock signals before transmitting the second clock signals embedded between the data signals, and transmit a LOCK signal $LOCK_0$ of a logic high state or a logic low state to the panel driving section according to whether clock signals are stabilized.

6. The display driving system according to claim 5, wherein, in the panel driving section in which the column driving units are serially connected, a first column driving unit is configured to receive the LOCK signal $LOCK_0$ of the logic high state from the timing control section, recover a received clock signal, and output a LOCK signal $LOCK_1$ of the logic high state to a next column driving unit in the series when the received clock signal is stabilized, and a final column driving unit in the series is configured to receive the logic high state of a $LOCK_{N-1}$ signal, recover a received clock signal, and output the logic high state of a $LOCK_N$ signal to the timing control section when the received clock signal is stabilized, wherein the timing control section is configured to end clock training when the logic high state of the $LOCK_N$ signal is inputted from the final column driving unit, and start transmission of the second clock signals embedded between the data signals.

7. The display driving system according to claim 6, wherein the timing control section is configured to implement the clock training until the $LOCK_N$ signal becomes the logic high state when the $LOCK_N$ signal changes to a logic low state while transmitting the second clock signals embedded between the data signals.

8. The display driving system according to claim 1, wherein a first column driving unit in the column driving units comprises a clock recovery circuit configured to generate received clock signals to be used for sampling data signals, and a receiving part configured to sample and output data signals included in a first second clock signal at a transition time (a rising edge or a falling edge) of the received clock signals.

9. The display driving system according to claim 8, wherein the first column driving unit further comprises a frequency detection circuit configured to detect frequency of a first first clock signal, and use the detected frequency when recovering the received clock signals in the clock recovery circuit.

10. The display driving system according to claim 8, wherein the clock recovery circuit is configured using a phase locked loop.

11. The display driving system according to claim 8, wherein the clock recovery circuit is configured using a delay locked loop.

12. The display driving system according to claim 8, wherein the clock recovery circuit is configured to generate the received clock signals using a first first clock signal that is transmitted from the transmission unit.

13. The display driving system according to claim 12, wherein the received clock signals have different phases, and amplitudes of the received clock signals are the same as the amplitudes of the data signals.

14. The display driving system according to claim 13, wherein, by using the received clock signals stabilized during a clock training interval, the receiving part is configured to recognize data signals transmitted first after the clock training interval ends as control data for controlling column driving units if a value of a bit of a first data signal transmitted after the clock signal is "0", and recognize that image data displayed in a display panel are inputted from a second data signal, so that the control data and the image data included in the data signals can be sampled.

15. The display driving system according to claim 13, wherein the clock recovery circuit is configured to recover a received clock signal $CK_0$ that has the same phase and frequency as a first first clock signal inputted during a clock training interval, in synchronism with a transition time of the first first clock signal, and generate a plurality of received clock signals $CK_1$ through $CK_N$ that are the same in frequency as and different in phase from the received clock signal $CK_0$.

16. The display driving system according to claim 12, wherein the received clock signals have different phases, and each of the received clock signals has a transmission rate lower than that of the data signals.

17. The display driving system according to claim 16, wherein the receiving part is configured to recover a received clock signal $CK_0$ that has a higher frequency than and the same phase as the first clock embedded data signal inputted during a clock training interval, in synchronism with a transition time of the first clock signal, and generate a plurality of received clock signals $CK_{90}$, $CK_{180}$, and $CK_{270}$ that are the same in frequency as and different only in phase from the received clock signal $CK_0$.

18. The display driving system according to claim 16, wherein, in order to learn sequence of the data sampled using the received clock signals, the receiving part further comprises a counter circuit configured to count the received clock signals used for sampling the data.

* * * * *

UNITED STATES PATENT AND TRADEMARK OFFICE

CERTIFICATE OF CORRECTION

PATENT NO. : 8,947,412 B2
APPLICATION NO. : 12/921246
DATED : February 3, 2015
INVENTOR(S) : Hyun-Kyu Jeon and Yong-Hwan Moon It is certified that error appears in the above-identified patent and that said Letters Patent is hereby corrected as shown below:

On the title page, item (54) and in the specification, col. 1, lines 1-3 the title of invention is changed from “DISPLAY DRIVING SYSTEM USING TRANSMISSION OF SINGLE-LEVEL EMBEDDED WITH CLOCK SIGNAL” to --DISPLAY DRIVING SYSTEM USING TRANSMISSION OF SINGLE-LEVEL SIGNAL EMBEDDED WITH CLOCK SIGNAL--.

Signed and Sealed this
Twelfth Day of May, 2015

Michelle K. Lee
*Director of the United States Patent and Trademark Office*